(No Model.)

P. H. MACK.
SWIVEL BAR FOR TEMPER SCREWS.

No. 496,315. Patented Apr. 25, 1893.

Witnesses
W. E. Allen
Geo. E. Cruse

Inventor
Patrick H. Mack
By Knight Bros
Attys.

UNITED STATES PATENT OFFICE.

PATRICK H. MACK, OF BRADFORD, PENNSYLVANIA.

SWIVEL-BAR FOR TEMPER-SCREWS.

SPECIFICATION forming part of Letters Patent No. 496,315, dated April 25, 1893.

Application filed March 31, 1890. Serial No. 346,132. (No model.)

*To all whom it may concern:*

Be it known that I, PATRICK H. MACK, a citizen of the United States, residing at Bradford, in the county of McKean and State of Pennsylvania, have invented certain new and useful Improvements in Temper-Screws for Drilling Oil and Artesian Wells, of which the following is a specification.

The object of my invention is to obviate the necessity of cutting and welding the links used to connect the rope clamp to the swivel bar ordinarily used, and also to obviate the necessity of taking the temper screw apart when it is necessary to repair or replace the links or swivel bar which becomes worn by the constant jar of the drilling tools, and my invention consists in forming slots or recesses in the upper edge of the swivel bar, in providing said slots with metal or other bushings which can be easily removed when they have become worn, and in holding the bushings in place by means of cap plates secured to the swivel bar.

Figure 1:
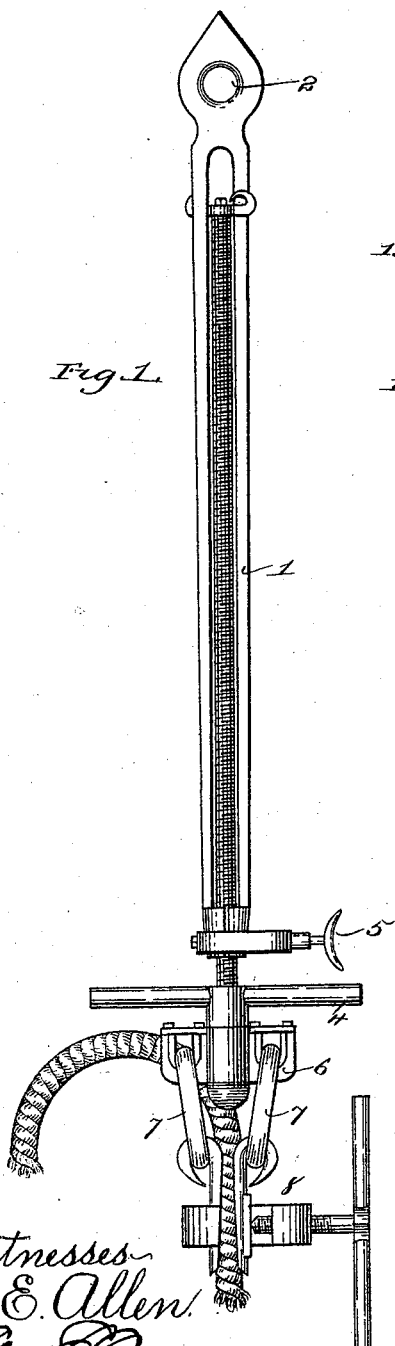
Figure 2:
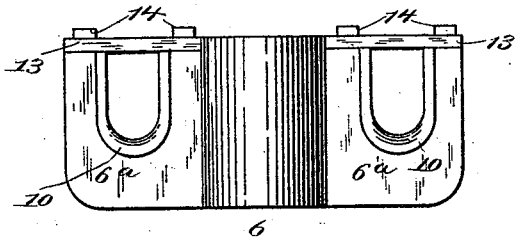
Figure 3:
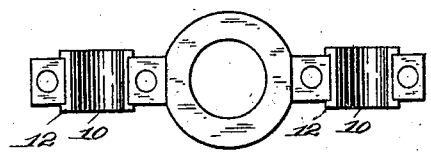
Figure 4:
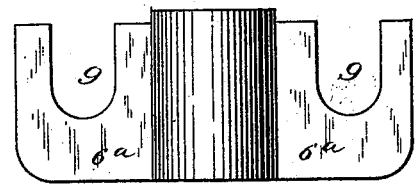
Figures 5, 6:
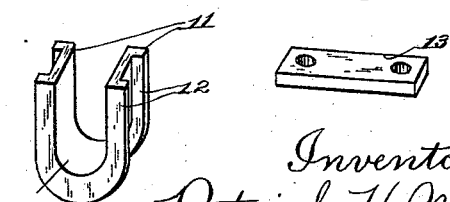

Referring to the drawings:—Figure 1 is a view of a temper screw showing my invention applied thereto. Fig. 2 is an enlarged view of the swivel bar. Fig. 3 is a top view of the same with the cap plate removed. Figs. 4, 5 and 6 are detail views.

1 represents the frame of a temper screw provided with the usual eye 2 for suspending the screw. The frame is bifurcated at 3 in order that the screw may be raised or lowered by the arms 4, and 5 is a yoke for clamping the screw in its raised or lowered position. Directly beneath the arms 4 is the swivel bar 6 to which is secured by means of the links 7 the rope clamp 8. The swivel bar 6 is provided with a slot or recess 9 in each of its wings 6ª which are adapted to receive and form a seat for a bushing 10. The bushing 10 which may be of steel or other suitable material, is provided with a groove 11, of the same width as the edge of the swivel bar, and also the flanges 12, the object of which is to prevent the bushing from being displaced laterally from its seat in the swivel bar.

13 represents a cap plate which is secured to the swivel bar by means of the bolts or screws 14 and is used to hold the bushing securely on to its seat and to prevent the links 7 from becoming disengaged from the swivel bar.

It will be seen from the above description that my improved swivel bar overcomes all of the difficulties arising from the use of the ordinary swivel bar. After the bushings or links have become worn they can be quickly and easily replaced, thus saving a great deal of time and expense.

Having thus described my invention, what I claim as new therein, and desire to secure by Letters Patent, is—

1. In a temper screw for drilling wells the combination of the frame, the screw supported in said frame, and the swivel bar for supporting the links of the rope clamp, said swivel bar being provided with the slotted or recessed wings and the detachable cap plate whereby the rope clamp links may be readily detached substantially as set forth.

2. In a temper screw for drilling wells, the combination of the frame, the screw supported in said frame, and the swivel bar for supporting the links of the rope clamp, said swivel bar being provided with the recessed or slotted wings, bushings formed with the groove 11 and flanges 12 fitting in said recesses or slots, and a cap plate for securely holding the bushings in place, substantially as set forth.

In testimony whereof I affix my signature in presence of two witnesses.

PATRICK H. MACK.

Witnesses:
JAMES C. BOYCE,
HENRY WEISKETTLE.